United States Patent [19]

Clay et al.

[11] 3,710,245
[45] Jan. 9, 1973

[54] INDUCTION METER HAVING POWER-FACTOR-ADJUSTER

[75] Inventors: Joe D. Clay, Lenoir; Joseph M. Keever, Raleigh, both of N.C.

[73] Assignee: Westinghouse Electric Corporation, Pittsburgh, Pa.

[22] Filed: March 22, 1971

[21] Appl. No.: 126,638

[52] U.S. Cl. .................................................324/138
[51] Int. Cl. ..............................................G01r 11/22
[58] Field of Search.............................324/137, 138

[56] References Cited

UNITED STATES PATENTS 2,871,448   1/1959   Schmidt et al......................324/138
3,493,862   2/1970   Ramsey et al......................324/137

Primary Examiner—Alfred E. Smith
Attorney—A. T. Stratton and C. L. Freedman

[57] ABSTRACT

The voltage winding of an induction meter directs voltage magnetic fluxes through a first path including the armature of the meter and a second path spaced from the armature. An adjustable power-factor control is responsive to flux in the second path. A fixed power-factor control is responsive to flux in the first path and restrains the adjustable control against improper movement.

5 Claims, 5 Drawing Figures

PATENTED JAN 9 1973 3,710,245

3,710,245

INDUCTION METER HAVING POWER-FACTOR-ADJUSTER

BACKGROUND OF THE INVENTION

This invention relates to induction measuring devices and it has particular relation to induction measuring devices which are responsive to a function of the product of two variable quantities.

Aspects of the invention are applicable to induction devices, particularly those which are responsive to a function of volt-amperes. Such induction devices may be employed for indicating or integrating functions of volt amperes such as vars or watts which are dependent on the product of voltage and current present in an alternating electrical circuit. The invention is particularly suitable for induction-type watthour meters and will be described with reference to such meters.

In a conventional induction-type watthour meter a voltage magnetic flux derived from a voltage winding and a current magnetic flux derived from current windings produce a shifting magnetic field in an air gap for driving an electroconductive armature. The response of the armature is dependent on the magnitudes and phase relationship of these magnetic fluxes.

The power factor of the meter has been adjusted by an adjustable relationship between an electro-conductive member and voltage magnetic flux as shown in U.S. Pat. No. 3,212,005 which issued Oct. 12, 1965.

The required power-factor control depends on the frequency for which the meter is designed. Thus as shown in U.S. Pat. No. 2,313,951, issued Mar. 16, 1943, two quadrature loops are employed for a watthour meter operating at a lower frequency such as 50 hertz. To condition the meter for operating at a higher frequency such as 60 hertz one of the loops is rendered ineffective as by opening such loop.

SUMMARY OF THE INVENTION

In accordance with the invention an induction watthour meter has a first voltage magnetic flux directed through a first path which includes the armature of the meter and a second voltage magnetic flux which is directed through a second path which is spaced from the armature. A fixed power-factor control is linked with the first voltage magnetic flux. An adjustable power-factor control has an electroconductive member linked with the second voltage magnetic flux. The fixed power-factor control has a portion located to prevent improper movement of the adjustable power-factor control.

BRIEF DESCRIPTION OF THE DRAWING

For a better understanding of the invention, reference may be had to the preferred embodiment exemplary of the invention shown on the accompanying drawing in which.

DESCRIPTION OF THE PREFERRED EMBODIMENTS

Figure 1:
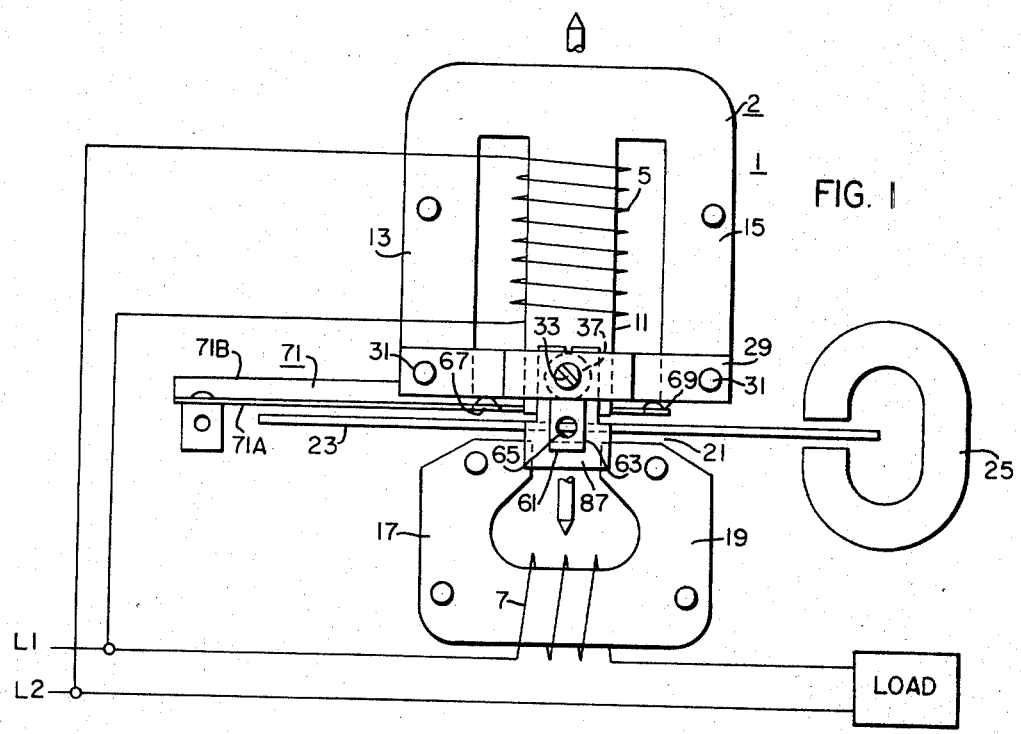
FIG. 1 is a schematic view with parts shown in elevation of a watthour meter system embodying the invention.

Referring to the drawing, FIG. 1 shows a watthour meter 1 for measuring energy supplied over an alternating current circuit represented by the conductors L1 and L2. Although this circuit may be a three-wire single-phase circuit or a polyphase circuit it will be assumed that it is a two-wire alternating-current circuit operating at a frequency of 60 hertz for transmitting electric energy from a line to a load. The watthour meter 1 includes a stator or electromagnet assembly which comprises a voltage magnetic section 2, a current magnetic section 3, and a voltage winding or coil 5. The magnetic sections are constructed of laminations of soft magnetic material such as silicon iron. The voltage section 2 is E-shaped and has a voltage pole 11 and two outer legs 13 and 15. The voltage coil 5 surrounds the voltage pole 11.

The current magnetic section has two current poles 17 and 19 which are spaced from the voltage pole 11 to define an air gap 21. The current poles 17 and 19 are formed by U-shaped laminations. A current winding 7 surrounds a portion of the U-shaped laminations. The voltage coil 5 has a large number of turns of copper conductor of small diameter whereas the current winding 7 may be constructed of a relatively small number of turns of large-diameter copper conductor. It will be noted that the voltage pole 11, legs 13 and 15 and the current poles 17 and 19 all lie substantially in a common plane.

An electro-conductive armature in the form of a disc 23 has a portion positioned in the air gap 21 and is mounted for rotation about the axis of the disc. A portion of the disc also is located in the air gap of a permanent magnet 25 for damping purposes. The construction of the watthour meter as thus far specifically set forth is well known in the art.

When the voltage coil 5 and the current winding 7 are properly energized from the conductors L1 and L2, a shifting magnetic field is produced in the air gap 21 which develops a torque acting between the disc 23 and the electromagnet for the purpose of producing rotation of the disc 23 about its axis. The rotation of the disc 23 is dependent on the product of the voltage between the conductors L1 and L2, the current flowing through the conductors and the phase displacement between such current and voltage. Rotation of the disc 23 may be employed in any suitable manner for indicating energy supplied over the conductors L1 and L2 as by operating a conventional register (not shown).

In order to adjust the phase relationship between the working voltage magnetic flux and the voltage supplied to the voltage winding a leakage path is established for voltage flux produced by the winding 5. This leakage path is linked by an electro-conductive material in the manner set forth in U.S. Pat. No. 3,212,005 issued Oct. 12, 1965.

Figure 2:
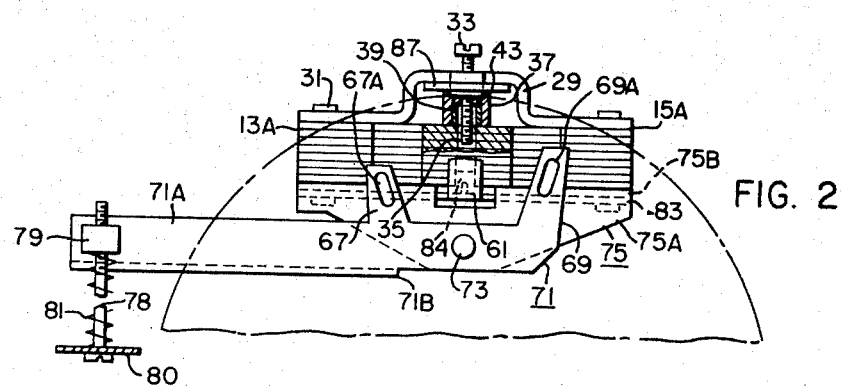
FIG. 2 is a bottom view with parts broken away of the voltage electromagnet of the meter system of FIG. 1.
Figures 3, 4, 5:
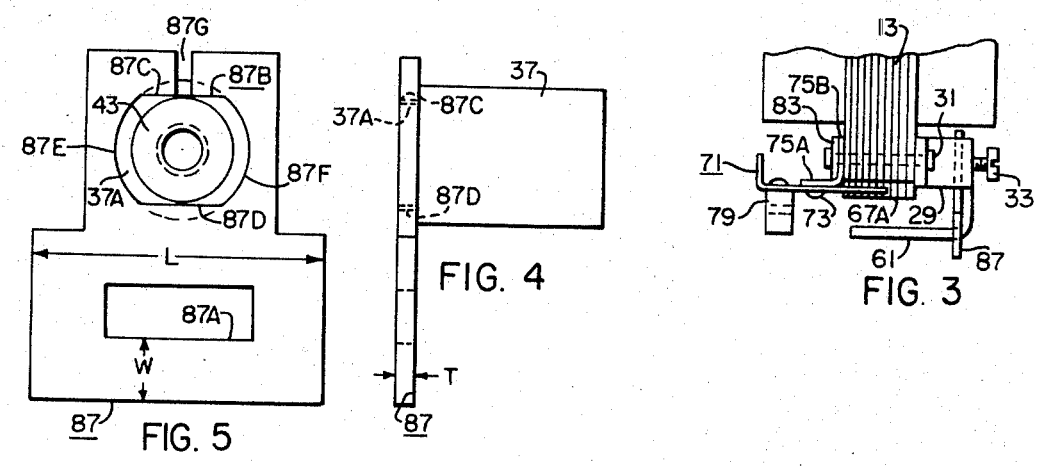
FIG. 3 is a view in end elevation of a portion of the voltage electromagnet of FIG. 2.
FIG. 4 is a view in side elevation of a power-factor control assembly employed in the meter system of FIG. 1.
FIG. 5 is a view in rear elevation of the assembly of FIG. 4.

As shown in FIGS. 1 and 2 the leakage path takes the form of a bracket 29 constructed of a soft magnetic material such as cold rolled steel. This bracket has its ends secured respectively to the outer legs 13 and 15 in any suitable manner as by rivets 31. It will be noted that this bracket extends across the free end of the voltage pole 11 and is spaced from such pole.

At a central point the bracket has a threaded opening for receiving a machine screw 33 constructed of a soft magnetic material such as soft magnetic steel. The tip of this screw may extend into an opening 35 provided in the voltage pole 11.

The bracket 29 and the screw 33 establish a path for leakage magnetic flux derived from the voltage coil 5 which extends from the voltage pole 11 to the screw 33. From the screw 33 the path continues through two parallel branches formed by two halves of the bracket 29 to the outer legs 13 and 15. The amount of leakage magnetic flux passing through this magnetic path may be adjusted by rotating the screw 33 to alter its axial position relative to the voltage pole 11.

The magnetic path formed by the screw 33 and the bracket 29 is employed for adjustably loading the voltage coil 5. To this end an electro-conductive member is positioned to be linked by magnetic flux passing through the magnetic path. In the embodiment of FIG. 2 the electro-conductive member takes the form of a tube 37 which may be constructed of copper and which is concentric with the screw 33.

In effect the tube 37 constitutes a closed secondary winding for a transformer in which the primary winding is represented by the voltage coil 5. Losses due to current flowing in the tube 37 are reflected back to the voltage coil 5. The loading is adjusted by manipulation of the screw 33 and is employed for adjusting the angle by which magnetic flux derived from the voltage coil 5 lags the voltage applied to the coil. By this expedient the working voltage magnetic flux applied by the voltage coil 5 to the air gap 21 and the armature 23 may be brought into quadrature with the current magnetic flux applied by the current winding 7 to the air gap when the watt-hour meter is operating to measure a unity power factor load. This may be referred to as power-factor adjustment or compensation.

Class II temperature compensation for the watthour meter may be provided as set forth in the aforesaid patent. As shown in FIG. 2 a sleeve 39 of an austenitic iron nickel alloy having approximately 30% nickel is concentric with, and intermediate, the screw 33 and the tube 37. Such a sleeve has a substantial negative temperature coefficient of permeability over the range of temperatures to which watthour meters are normally subjected in operation.

In order to improve the efficiency of the watthour meter a soft magnetic tongue 61 is located intermediate the pole faces of the current poles 17, 19 with its upper face in substantially the same plane as such pole faces. This tongue is connected through a soft magnetic element 63 to the mid part of the bracket 29. The tongue 61, the element 63 and the bracket 29 are integrally constructed from a sheet of soft magnetic material.

The tongue 61 is spaced from the pole face of the voltage pole 11 to define an air gap in which the armature 23 is located. Working voltage magnetic flux which enters this air gap from the voltage pole passes through the tongue 61, the element 63, the bracket 29, and the two legs 13 and 15 in parallel back to the voltage pole 11.

The structure thus far specifically described provides good performance. However, the accuracy has been found to fall off when the voltage coil 5 is energized by a reduced voltage. For example, the voltage coil 5 may be designed for energization by a voltage within the range of 240 volts or less. Assuming that the accuracy is 100 percent when the voltage coil is energized by the full voltage or 240 volts, it has been found that when the voltage coil is energized by half voltage or 120 volts the meter runs slightly slow and the accuracy drops to 99 or 98 percent lagging power factor. Although such accuracy is adequate for a number of applications of the watthour meter an improvement in such accuracy is desirable.

The path followed by the working voltage magnetic flux is designed to saturate within the range of rated voltage for which the watthour meter is designed. Conveniently the element 63 may be given a cross section such that it is saturated when the voltage coil is energized by 240 volts. However, when the voltage coil is energized by 120 volts the cross section is not saturated. This construction may be proportioned to provide a substantially uniform accuracy of the watt-hour meter over the voltage range from 240 volts to less than 120 volts.

In FIG. 1 the desired cross section of the element 63 is provided by a hole 65 which extends through the element to decrease its cross section. Such a hole provides the desired reduction in cross section while assuring adequate rigidity of the parts.

In order to provide light-load-calibration of the meter recourse is had to the auxiliary voltage pole faces 13A and 15A which the legs 13 and 15 present across the air gap 21 from the current poles. Magnetic voltage fluxes passing through these pole faces enter the armature 21 and produce auxiliary torques acting on the armature in opposite directions and effective under light-load conditions. Thus, as long as these torques are balanced they apply no resultant torque to the armature.

Light-load calibration of the meter is effected by controlling the balance between the auxiliary torques. To this end soft magnetic arms 67 and 69 are biased respectively against the pole faces 13A and 15A respectively. If the arms are positioned to balance the auxiliary torques the magnetic fluxes supplied through these pole faces have no resultant effect on the torque applied to the armature. If the arm 67 is moved downward in FIG. 2 and the arm 69 is moved upward from the balance or neutral positions, an unbalance results which applies a resultant torque acting on the armature in a first direction. If the movements of the arms are in the reverse directions the unbalance applies a resultant torque acting on the armature in a second direction opposite to the first direction.

Although the arms could be positioned independently of each other preferably they are both connected to a lever or member 71 which is pivotally mounted by a rivet 73 on the horizontal flange 75A of a bracket 75 for rotation about a vertical axis. The bracket 75 has a vertical flange 75B secured to the voltage section. Although the member 71 may be constructed of non-magnetic material preferably the member and the arms 67 and 69 are constructed integrally of soft magnetic sheet material such as steel. The member 71 includes a part 71A in a horizontal plane from which the arms project and a vertical flange 71B which stiffens the member.

Adjustment of the arms 67 and 69 is effected through a nut 79 which is pivotally mounted on the free end of the member 71 for rotation about a vertical axis. A headed screw 78 passes through an opening in a fixed structure 80 secured to the stator of the meter and is in threaded engagement with the nut. A helical cal spring 81 surrounds the screw and is compressed between the nut 79 and the structure 80. Thus the spring biases the member 71 about the axis of the rivet 73 in a clockwise direction as viewed in FIG. 2. The screw 81 has a screw-driver slot and may be rotated from the front of the meter for light-load calibration.

Inasmuch as the bracket 75 is of non-magnetic material, such as brass or aluminum, its vertical flange 75B may serve as a non-magnetic spacer for a soft magnetic shunt 83, which may be of steel strap, extending adjacent the free ends of the voltage pole 11 and the legs 13 and 15. Also, further non-magnetic spacing from the center of the voltage pole 11 may be provided by a brass or aluminum headed stud 84 inserted in opening 35 of voltage pole 11 opposite to the side facing the tip of screw 33. The stud 84 has a body within the opening 35 and a head larger in diameter than the opening, the head acting to space the shunt from the voltage pole. By replacing the stud by one having a thicker head the shunt is forced further away from the pole to decrease its shunting effect. The rivets 31, which are of non-magnetic material such as brass or aluminum pass through holes in the shunt 83, aluminum, flange 75A, the laminations of the legs 13 and 15 and the bracket 29 to unite securely these parts.

Each of the arms 67 and 69 is biased against the associated pole face 13A or 15A by the inherent resiliency of the material of which the arms and the member 71 are formed. In order to assure smooth movement of the arms over the pole faces each arm has an elongated projection 67A or 69A extending towards the associated pole face. Each projection is formed by molding the material of the associated arm and is long enough to bridge several laminations of the associated pole face, essentially with a line contact.

In the neutral or balanced positions of the arms 67 and 69 they bridge unequal areas of their associated pole faces. This is because of the asymmetric construction of the member 71. It is for this reason that the arm 67 is shown shorter than the arm 69. With the illustrated construction the load-adjustment range is symmetrical with the relative physical position of the member 71.

If the light-load performance of the meter is inaccurate the screw 78 is adjusted or rotated for the purpose of moving the arms 67 and 69 in opposite directions across the associated pole faces. This in effect magnetically shifts the voltage magnetic flux field in the air gap in either direction dependent on the direction of rotation of the screw. The screw is rotated in a direction and to an extent suitable for providing light-load calibration.

The structure thus far specifically described is similar to that described in U.S. Pat. No. 3,493,862 issued Feb. 3, 1970. The position of the magnetic light-load adjuster does not materially affect the power factor of the meter.

As pointed out in U.S. Pat. No. 3,212,005 a plastic washer 43, desirably constructed of nylon, is intended to prevent alteration in the position of the screw 33 under the influence of vibration or shock. However, when the screw is rotated for adjustment purposes, the combined washer 43, tube 37 and sleeve 39 assembly may rotate as a unit and may actually force or "jack" the voltage pole 11 out of the normal plane of the voltage section 2. If such jacking is permitted stability and calibration can be affected adversely.

Certain applications require increased power-factor compensation. Let it be assumed that the meter is designed for normal 60 hertz service. If the same meter is employed for 50 hertz service it will be slow at 50 percent lagging power factor. To compensate for this, increased lagging of the voltage magnetic flux at 50 percent lagging power factor is provided for such 50 hertz service.

The increased lagging is provided by a quadrature loop 87 constructed from a sheet of electroconductive material such as copper. The quadrature loop 87 has a window or slot 87A for receiving the tongue 61. Thus the loop is linked with the working voltage magnetic flux which passes through the tongue 61 and the disc 23. Because of the small size of the tongue and the substantial flux passing through it, the loop can be small and efficient. This is important in all meters and particularly important in meters designed to have low watt loss in the potential circuit because in such low loss meters the loop must provide a larger proportion of the total lagging.

The loop 87 has a non-circular opening 87B which desirably may be defined by two flat parallel surfaces 87C and 87D having their ends connected by arcs 87E and 87F. These arcs are circular about a common axis. The tube 37 has a neck 37A which is proportioned to fit snugly into the opening 87B, preferably by a press fit. Inasmuch as the flat surfaces 87C and 87D prevent rotation of the tube 37, jacking of the voltage pole cannot take place.

A slot 87G extends from the opening 87B to the exterior of the loop.

The amount of lagging introduced by the loop is dependent on the resistance of the path taken by current induced in the loop. Thus the amount of lagging may be increased or decreased by increasing or decreasing the thickness T of the loop. Alternatively the width W or length L of the current path components may be changed, or the slot 87G may be omitted.

It should be noted that the loop 87 does not require a special meter construction, but may be installed on, or removed from, a conventional meter. Thus the meter of FIG. 1 may be designed for 60 hertz service with a thin loop 87 or with no loop 87. For 50 hertz service the thin loop 87 may be replaced by a thicker loop 87 or a loop 87 may be added for the purpose of calibrating the meter for 50 hertz service.

The loop 87 in effect provides a coarse lagging control which places the meter within the range of adjustment of the fine lagging control represented by the screw 33. Inasmuch as these are complementary controls, one may be selected to compensate for a change in the other. Thus if it is desired to change the length of the screw 33 (e.g. to obtain increased adjustment range) the thickness of the loop 87 may be selected to make the center location of the screw 33 correspond to the proper power-factor compensation for the average meter of the resultant design.

The power factor controls represented by the loop 87 and the screw 33 both act on the voltage section of the electromagnet assembly.

With the screw 33 in its outer position away from the voltage pole in the illustrated embodiment, the loop 87 acts as a fixed coarse adjustment which overlags the working voltage magnetic flux by a small amount. The screw 33 then is operated as a fine adjustment and is screwed inwardly towards the voltage pole to balance out the extra lagging of the working voltage magnetic flux. This adjusts the meter to exact calibration speed.

As previously noted, the loop 87 coacts with the screw 33 to improve the overall adjustment capabilities of the meter. If the loop 87 is proportioned to overlag the meter by a substantial amount when the screw 33 is in its outer position, such overlap permits adoption of a longer screw. The longer screw can provide a larger overall range of adjustment or a larger range of adjustment per turn.

We claim:

1. In an induction device responsive to a function of the volt-amperes in an alternating current circuit, an electromagnet unit including a soft magnetic voltage section; a soft magnetic current section cooperating with the voltage section to define an air gap therebetween; an electroconductive armature device mounted for rotation relative to the electromagnet unit about an axis; said armature device having a portion positioned in the air gap to develop a torque from said resultant magnetic field which acts to rotate the armature device relative to the electromagnet unit about said axis; said voltage section including a voltage pole having a pole face on a first side of the armature device, a soft iron member having a portion on a second side of the armature device, and a voltage winding means for producing a first alternating magnetic flux and directing a working part of said first magnetic flux through the armature device and the soft iron member and further directing a second part of said first magnetic flux through a magnetic path clear of said armature device; and a current winding means effective when energized by alternating current for directing a second alternating magnetic flux into the air gap to establish with the working part of said first magnetic flux a shifting resultant magnetic field in the air gap; wherein the electromagnetic unit includes the improvement comprising: a first electroconductive phase-displacing unit including a first electroconductive member surrounding said soft iron member and linked with the working part of said magnetic flux for lagging the phase thereof; and a second electroconductive phase-displacing unit including an auxiliary soft iron element establishing an auxiliary path for the second part of said first magnetic flux and a second electroconductive element surrounding said auxiliary soft magnetic member with an adjustable one of said auxiliary soft iron and said second electroconductive elements being rotatably adjustable about an axis relative to a second element to vary the lagging of the phase of said second part of said first magnetic flux; and said first electroconductive member including a part engaging the second element to restrain rotation of such second element.

2. An induction device as claimed in claim 1 wherein the auxiliary soft magnetic element comprises a soft magnetic screw constituting the adjustable one of the elements in threaded engagement with another part of the soft iron member, the magnetic reluctance of the path established by the soft magnetic member being dependent on the position of the soft magnetic screw, said second electroconductive element being subject to rotation by said magnetic screw, said first electroconductive member interlocking with said second electroconductive element to restrain such element against rotation by the screw.

3. An induction device as claimed in claim 2 wherein said second electroconductive element is tubular with a non-circular neck part; and said first electroconductive member is made of a sheet material including a slot for receiving said soft iron member and a non-circular opening for receiving said neck part of said second electroconductive element so as to be interlocked therewith.

4. A device as claimed in claim 1 wherein said first and second phase displacing units displace the phase of the magnetic flux produced by the voltage winding means in opposite directions and the first electroconductive member is proportioned to overlag the working voltage magnetic flux beyond a desired ultimate lagging value, and the adjustable one of said elements has a range of adjustment sufficient to balance the extra lagging of the working voltage magnetic flux.

5. An induction device as claimed in claim 1 wherein said first electroconductive phase-displacing unit overlags the first part of said first alternating magnetic flux beyond a desired ultimate lagging value, and the second phase displacing unit is adjustable through a range sufficient to balance the extra lagging of said working part of the first alternating magnetic flux by the first electroconductive phase-displacing unit.

* * * * *